United States Patent
Nakagawa

(10) Patent No.: US 6,707,994 B2
(45) Date of Patent: Mar. 16, 2004

(54) DEVICE FOR DETERMINING AMOUNT OF FOCUS ADJUSTMENT

(75) Inventor: Kazuyuki Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 10/143,874

(22) Filed: May 14, 2002

(65) Prior Publication Data

US 2002/0172515 A1 Nov. 21, 2002

(30) Foreign Application Priority Data

May 17, 2001 (JP) ........................................ 2001-147227

(51) Int. Cl.$^7$ ............................................. G03B 13/36
(52) U.S. Cl. ..................... 396/97; 396/100; 396/104; 396/114
(58) Field of Search ..................... 396/97, 100, 104, 396/111, 114

(56) References Cited

U.S. PATENT DOCUMENTS 5,572,013 A * 11/1996 Ohsawa .................. 396/114 X
5,995,766 A   11/1999 Yamashita .................... 396/97
2002/0044772 A1  4/2002 Yamasaki et al. ........... 396/104

FOREIGN PATENT DOCUMENTS

JP   11-109219   4/1999   ............ G02B/7/34
JP   2002-72071  3/2002   ............ G02B/7/28

* cited by examiner

Primary Examiner—W. B. Perkey
(74) Attorney, Agent, or Firm—Fitzpatrick, Cella, Harper & Scinto

(57) ABSTRACT

A device for determining an amount of focus adjustment for an image-forming optical system which forms an image on a predetermined image plane includes a sensor, an image-re-forming optical system which re-forms the image on the sensor, and a reference member disposed at a position close to the predetermined image plane of the image-forming optical system. The projection image of the reference member is detected by the sensor, and a correction calculation is performed on the basis of the displacement of the projection image of the reference member from a preset position, so that errors in detection results caused by temperature variation, etc., are corrected.

5 Claims, 12 Drawing Sheets

1

DEVICE FOR DETERMINING AMOUNT OF FOCUS ADJUSTMENT

BACKGROUND OF THE INVENTION

1. Field of the Invention

The present invention relates to a focus detecting device which detects the focusing state of an imaging optical system, to a device for determining the amount of focus adjustment for an image-forming optical system, and to an improved imaging device.

2. Description of the Related Art

Focus detecting devices which detect the focusing state of an imaging optical system by comparing images formed by light beams passing through different areas in the imaging optical system are known in the art. In such focus detecting devices, a detection value representing the state of the imaging optical system includes errors caused by variations in ambient temperature and ambient humidity of an image-re-forming optical system used for forming images of each area.

Since temperature sensors are generally used not only for focus detection but also for other purposes, they are often disposed at positions apart from focus detection units. Accordingly, the detection temperature often differs from the actual temperature of an image-re-forming lens installed in a focus detecting device. Therefore, it is difficult to correct errors caused by temperature variation in an image-re-forming lens with high accuracy. Although a method in which an AF sensor containing a temperature sensor is used has been suggested, there is a risk in that the temperature of the image-re-forming lens cannot be accurately detected because of heat diffused from the AF sensor itself.

In addition, as disclosed in Japanese Patent Laid-Open No. 11-109219, a technique is known in which a temperature detection unit is attached to a focus detecting device and the focal position is corrected on the basis of a temperature, which is detected indirectly.

In addition, as disclosed in Japanese Patent Application No. 2000-261496, another technique is known in which a pattern is formed on an optical component and a correction unit corrects information regarding the focusing state of an imaging optical system by detecting the position of the pattern. More specifically, a pattern is placed on a deflecting mirror disposed in the light path of the imaging optical system, and is detected by a detection unit so that changes in the deflecting mirror can be detected.

SUMMARY OF THE INVENTION

According to one aspect of the present invention, a device for determining an amount of focus adjustment for an image-forming optical system which forms an image on a predetermined image plane includes a sensor; an image-re-forming optical system which re-forms the image on the sensor; a reference member disposed at a position close to the predetermined image plane of the image-forming optical system; and a processing circuit which detects a projected image of the reference member by using the sensor and determines the change in the amount of focus adjustment caused by the change in operating environment in which the device for determining the amount of focus adjustment is used.

According to another aspect of the present invention, a device for determining an amount of focus adjustment for an image-forming optical system which forms an image on a predetermined image plane, includes a sensor; an image-reforming optical system which re-forms the image on the sensor; a reference member included in one of the image-forming optical system and the image-re-forming optical system; and a processing circuit which detects a projected image of the reference member by using the sensor and determines the change in the amount of focus adjustment caused by the change in operating environment in which the device for determining the amount of focus adjustment is used.

Further objects, features and advantages of the present invention will become apparent from the following description of the preferred embodiments (with reference to the attached drawings).

DESCRIPTION OF THE PREFERRED EMBODIMENTS

Embodiments of the present invention will be described below in detail with reference to the accompanying drawings.

Figure 1:
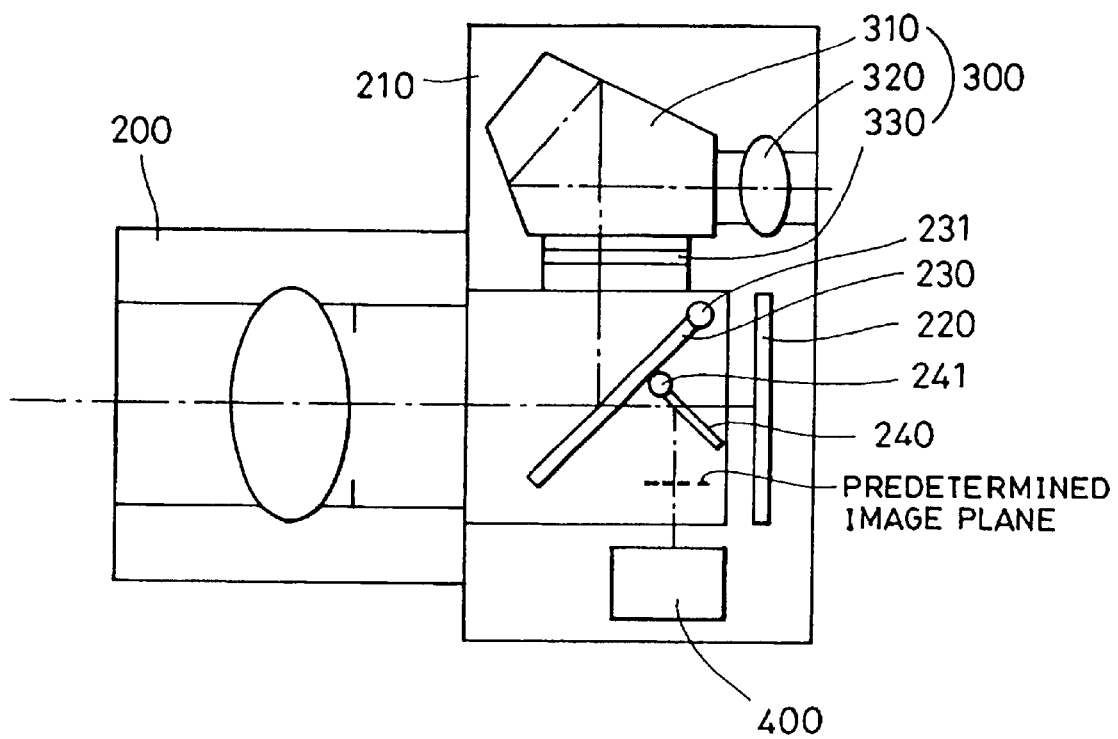
FIG. 1 is a diagram showing the optical configuration of an imaging device according to a first embodiment of the present invention.

FIG. 1 is a diagram showing the optical configuration of an imaging device according to a first embodiment of the present invention.

With reference to FIG. 1, reference numeral 200 denotes an imaging optical system which projects an object onto an imaging element of the imaging device, and reference numeral 210 denotes the main body of the imaging device to which the imaging optical system 200 is attached. Reference numeral 220 denotes the imaging element onto which an image of the object is projected by the imaging optical system 200, and reference numeral 230 denotes a main mirror which separates a light beam component from a light beam emitted from the imaging optical system 200, the light beam component being guided toward an observing optical system, which will be described below. The main mirror 230 is retained by a main-mirror hinge shaft 231 in such a manner that the main mirror 230 can be moved away from the imaging light path. Reference numeral 240 denotes a submirror which guides the light beam emitted from the imaging optical system 200 toward a focus detecting device, which will be described below. The submirror 240 is retained by a submirror hinge shaft 241 in such a manner that the submirror 240 is rotatable relative to the main mirror 230.

Reference numeral 300 denotes the observing optical system which allows the image taken by the imaging element 220 to be observed. The observing optical system 300 includes an erect-image optical system 310, an eyepiece 320, and a focusing glass 330. Reference numeral 400 denotes the focus detecting device which detects the focusing state (defocus information) of the imaging optical system 200 by re-forming an image formed in a predetermined image plane by the imaging optical system 200 on a sensor unit, which serves as a detection unit, by using an image-re-forming optical system.

Figure 2:
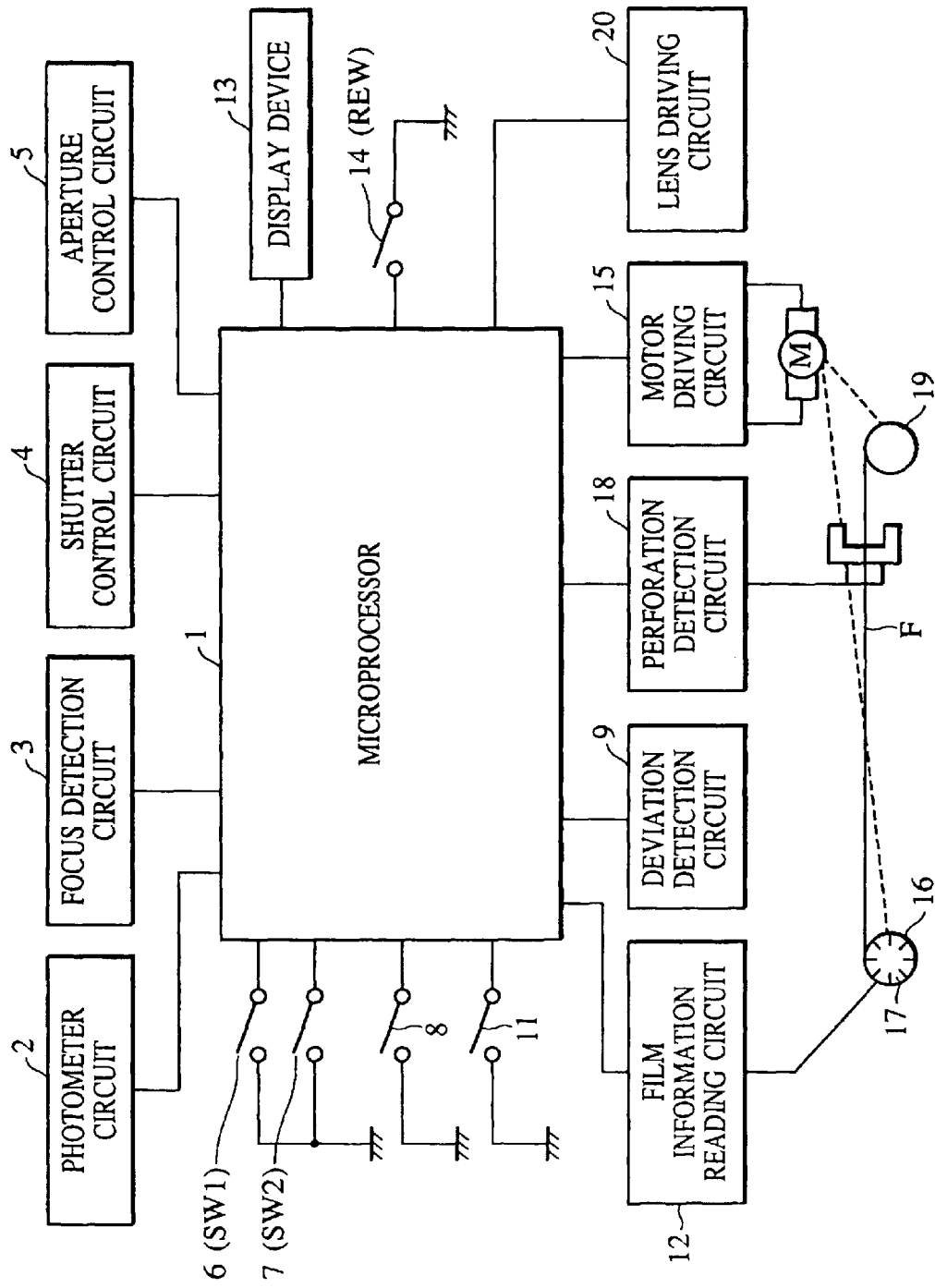
FIG. 2 is a block diagram showing the electrical construction of the imaging device according to the first embodiment of the present invention.

FIG. 2 is a block diagram showing the electrical construction of the above-described imaging device.

With reference to FIG. 2, reference numeral 1 denotes a microprocessor which controls the overall operation of the camera (imaging device), reference numeral 2 denotes a photometer circuit, reference numeral 3 denotes a focus detection circuit, reference numeral 4 denotes a shutter control circuit, and reference numeral 5 denotes an aperture control circuit, all of which are well known in the art.

In addition, reference numeral 6 (SW1) denotes a switch used for starting light measurement and focus detection, and reference numeral 7 (SW2) denotes a switch used for starting a shooting operation. The switches 6 and 7 are turned on when a release button is depressed by a first amount and a second amount, respectively. Reference numeral 8 denotes a main switch, reference numeral 9 denotes a deviation detection circuit, reference numeral 11 denotes a film-compartment cover switch used for detecting whether a film compartment, which receives a film, is opened or closed, and reference numeral 12 denotes a film-information reading circuit used for reading information shown on an information label 17 provided on a film cartridge 16. Reference numeral 13 denotes a display device which includes a display used for showing the shutter speed, the aperture stop, whether or not the film cartridge 16 is contained, warning not to take out the film, etc., and a driving circuit for the display. Reference numeral 14 (REW) denotes a rewind switch used for issuing a command to start rewinding the film before reaching the end of the film. Reference numeral 15 denotes a motor driving circuit used for winding and rewinding the film. More specifically, the motor driving circuit 15 rotates a film-winding spool 19 to wind the film F around the film-winding spool 19, or rotates a film-feeding spool contained inside the film cartridge 16 in a rewinding direction to rewind the film F inside the film cartridge 16.

As described above, reference numeral 17 denotes the information label provided on the film cartridge 16. Reference numeral 18 denotes a perforation detection circuit which detects perforations formed in the film F. The perforation detection circuit 18 includes, for example, a light-emitting unit and a light-receiving unit of a photo-reflector, and determines whether or not the perforations are provided. Reference numeral 20 denotes a lens driving circuit used for focusing.

Figure 3:
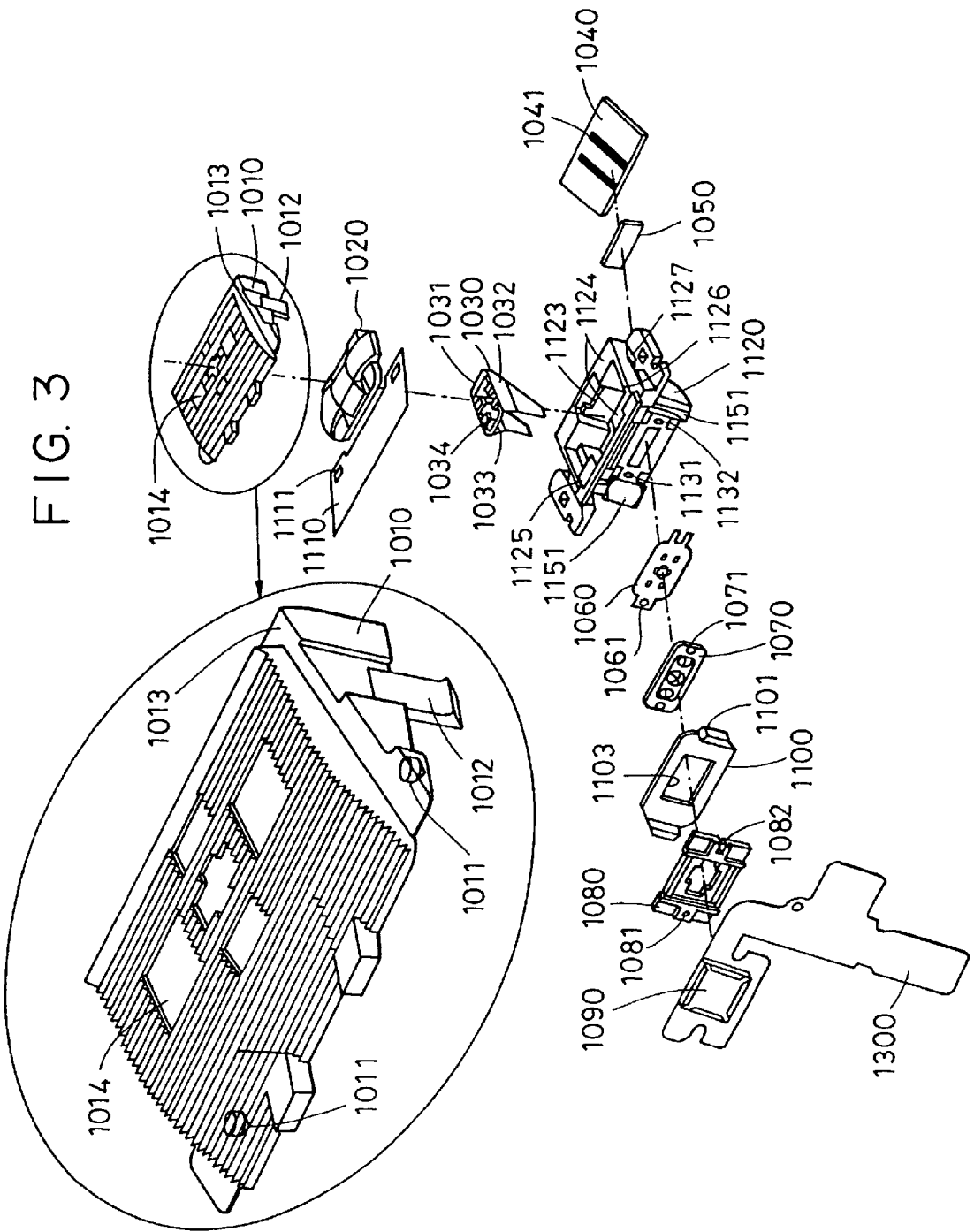
FIG. 3 is an exploded perspective view showing the construction of a focus detecting device according to the first embodiment of the present invention.
Figure 4:
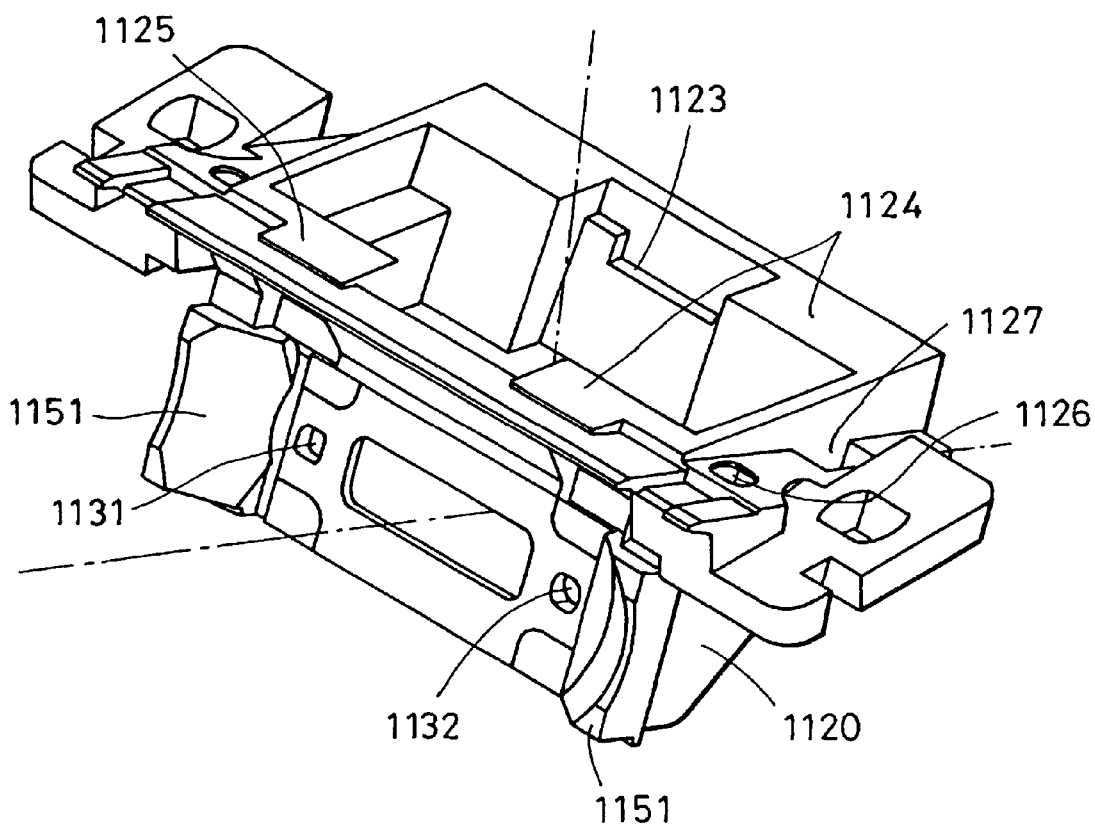
FIG. 4 is an enlarged perspective view of a main block shown in FIG. 3.

FIG. 3 is an exploded perspective view showing the construction of the focus detecting device 400 installed in the above-described imaging device. FIG. 4 is a perspective view of a main block 1120 shown in FIG. 3, and FIG. 5 is a diagram showing a part at which an infrared-cut filter is attached in the focus detecting device 400.

Figure 5:
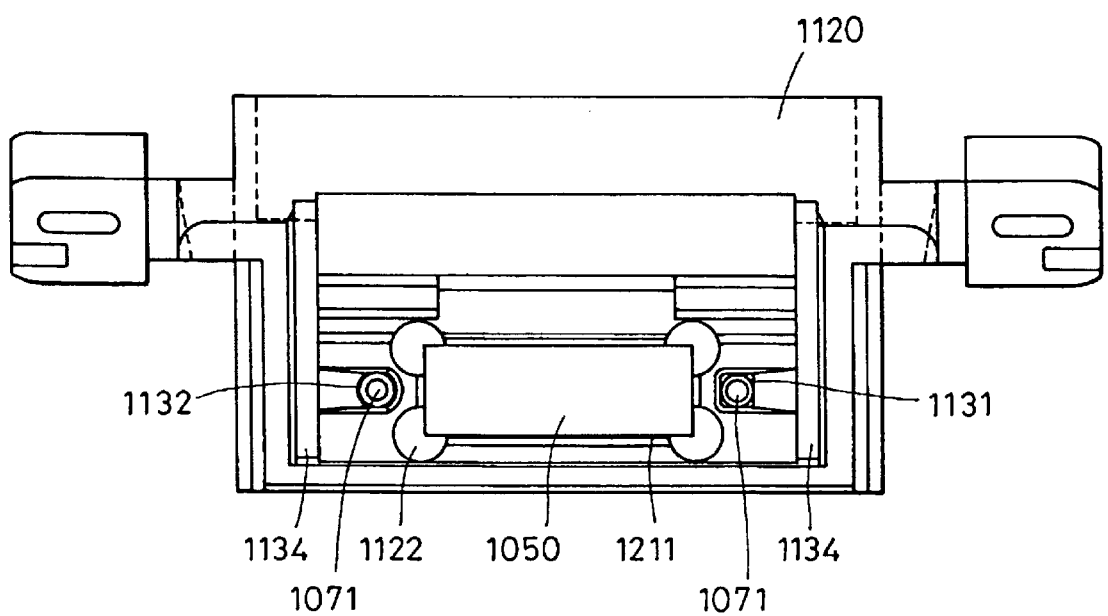
FIG. 5 is a diagram showing a part at which an infrared-cut filter is attached in the focus detecting device shown in FIG. 3.

With reference to FIGS. 3 to 5, the main block 1120 is formed in a shape such that various components of the focus detecting device can be positioned and retained. The infrared-cut filter 1050 is positioned relative to the main block 1120 by being disposed in an infrared-cut-filter positioning portion 1121 formed in the main block 1120. In addition, the infrared-cut filter 1050 is adhered and fixed relative to the main block 1120 by infrared-cut-filter adhering portions 1122 provided at the periphery of the infrared-cut-filter positioning portion 1121.

A light-blocking plate 1030 is positioned relative to the main block 1120 by a light-blocking-plate positioning portion 1031 of the light-blocking plate 1030 and a light-blocking-plate positioning portion 1123 of the main block 1120, and is adhered and fixed relative to the main block 1120. The light-blocking plate 1030 includes wall portions 1032 and 1033 which serve to prevent the effective light beam for one of the focus-detection visual fields, which have passed through a field lens 1020, from being incident on sensor areas for the other focus-detection visual fields. In addition, an opening 1034 for allowing a focus-detection light beam to pass is formed between the wall portions 1032 and 1033.

The field lens 1020 is subjected to various adjustments first, and is then adhered and fixed relative to the main block 1120 by field-lens fixing portions 1124 provided on the main block 1120.

A visual-field mask 1010 is positioned relative to the main block 1120 by fitting a pair of visual-field-mask positioning shafts 1011 provided on the visual-field mask 1010 into a pair of visual-field-mask positioning holes 1125 and 1126 formed in the main block 1120. The visual-field-mask positioning hole 1125 restricts the movement of the visual-field mask 1010 along the surface at which the visual-field mask 1010 is attached and the visual-field-mask positioning hole 1126, which has an oblong shape, restricts the rotation of the visual-field mask 1010 relative to the visual-field-mask positioning hole 1125. In addition, the visual-field mask 1010 is fixed relative to the main block 1120 by engaging a pair of visual-field-mask fixing elastic claw portions 1012 provided on the visual-field mask 1010 with a pair of visual-field-mask fixing holes 1127 formed in the main block 1120. In addition, the visual-field mask 1010 is also provided with a visual-field-mask restraining portion 1013 which serves to prevent the visual-field mask 1010 from being raised even when the visual-field-mask fixing elastic claw portions 1012 are disengaged from the visual-field-mask fixing holes 1127 after the focus detecting device is mounted in the camera.

The visual-field-mask restraining portion 1013 also serves to reduce a gap between a mirror box of the camera and the focus detecting device.

Visual-field-mask openings 1014 for restricting the detection area are formed in the visual-field mask 1010. In the first embodiment, the visual-field-mask openings 1014 also serve as reference members used for obtaining correction data.

A light-blocking sheet 1110 is positioned by a pair of light-blocking-sheet positioning holes 1111 formed in the light-blocking sheet 1110 and a pair of light-blocking-sheet positioning portions (not shown) formed on the visual-field mask 1010, and is fixed relative to the main block 1120 by being disposed between the visual-field mask 1010 and the main block 1120.

A mirror 1040 is positioned by mirror positioning portions 1134 formed in the main block 1120 and is adhered and fixed relative to the main block 1120. The mirror 1040 is provided with light-blocking mask portions 1041 on the surface thereof, the light-blocking mask portions 1041 having a shape such that unwanted light beams for each of the focus-detection visual fields can be blocked. When the focus-detection light beams are deflected toward a sensor unit, the light-blocking mask portions 1041 block unwanted light beams which pass through a gap between the light-blocking plate 1030 and the mirror 1040. The light-blocking mask portions 1041 are formed approximately parallel to each other along the direction in which sensors (pixels) corresponding to focus-detection visual fields are aligned. Since light-blocking patterns are not formed in the direction in which the focus-detection light beams are divided, ghost images due to reflection at the edge of the pattern are not generated.

An image-re-forming lens unit 1070, which serves as an image-re-forming optical system, is positioned by fitting a pair of image-re-forming-lens positioning shafts 1071 into and a pair of holes formed in the main block 1120 including an image-re-forming-lens positioning hole 1131 having a rectangular shape and an image-re-forming-lens positioning hole 1132 having an oblong shape, and is adhered and fixed relative to the main block 1120. A multiple-aperture plate 1060 is positioned relative to the image-re-forming lens unit 1070 by multi-hole-aperture-plate positioning portions 1061, which correspond to the image-re-forming-lens positioning shafts 1071 provided on the image-re-forming lens unit 1070, and is fixed relative to the main block 1120 by being disposed between the image-re-forming lens unit 1070 and main block 1120.

A sensor supporter 1100 is positioned by a pair of abutting portions 1101 formed on the sensor supporter 1100 and a pair of sensor-supporter receiving portions 1151 formed on the main block 1120. The abutting portions 1101 have a spherical shape with a common central axis and the sensor-supporter receiving portions 1151 have a curved shape. The sensor supporter 1100 is positioned in such a manner that the sensor supporter 1100 can swing along a curve defined by the curvature R1 of the abutting portions 1101 and along a curve defined by a curvature R2 of the sensor-supporter receiving portions 1151, so that the inclination of the sensor supporter 1100 can be adjusted along a plurality of axes. The sensor supporter 1100 is subjected to various adjustments such as inclination adjustment for the sensor unit, and is then adhered and fixed relative to the main block 1120.

A sensor unit 1090, which includes line sensors and serves as the detection unit, is adhered and fixed to a sensor holder 1080 in advance, so that the sensor holder 1080 and the sensor unit 1090 are combined together. Reference numeral 1300 denotes a circuit substrate which connects the sensor unit 1090 and the microprocessor 1 of the camera.

The combined body of the sensor holder 1080 and the sensor unit 1090 is retained relative to the main block 1120 by the sensor supporter 1100, and is adhered and fixed to the sensor supporter 1100 after various adjustments such as an inclination adjustment and a position adjustment are performed. The sensor holder 1080 is provided with grooves for guiding an adhesive to the adhesion surface of the sensor supporter 1100.

Figure 6:
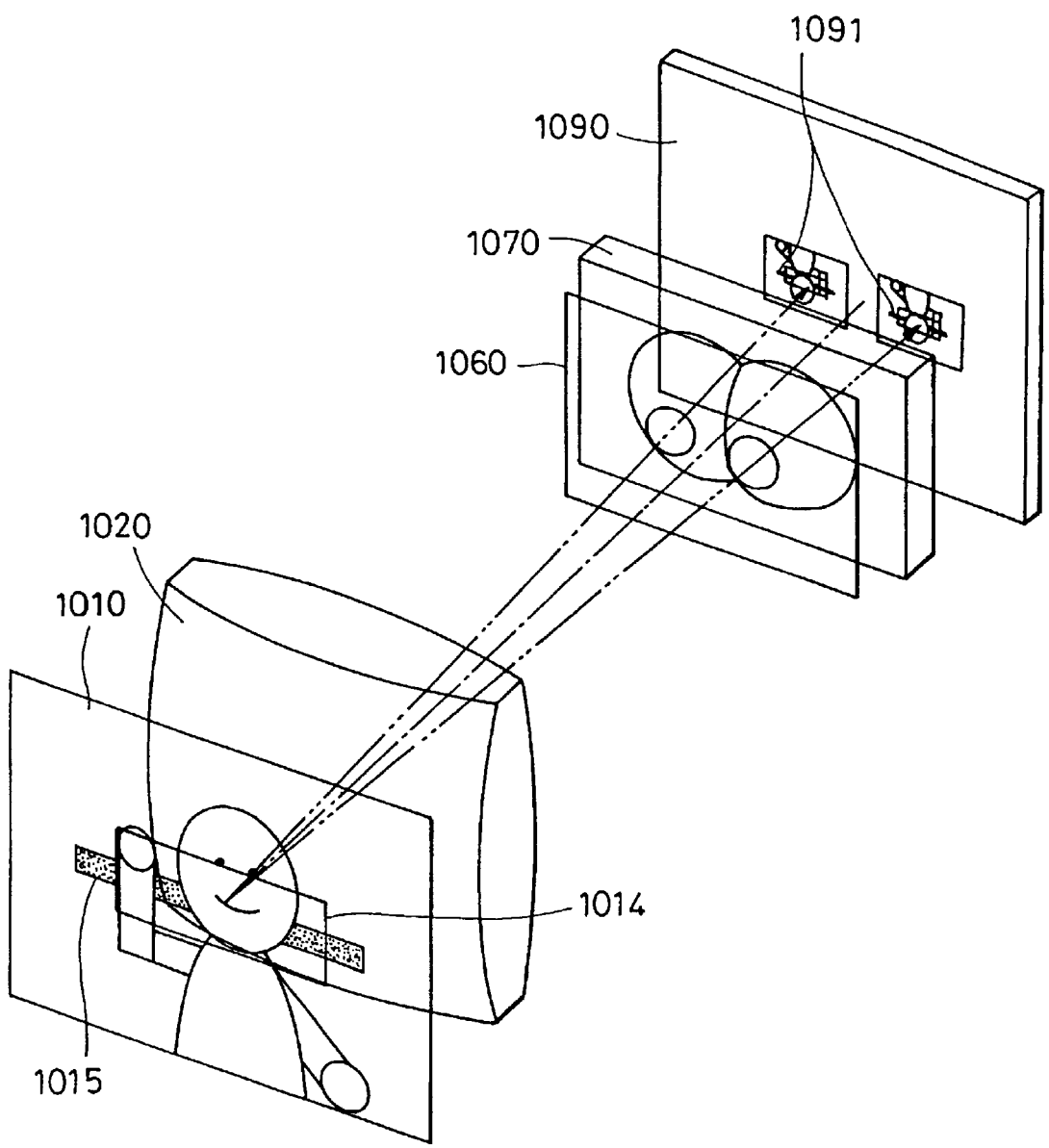
FIG. 6 is a perspective view showing the optical configuration of a main part of the focus detecting device shown in FIG. 3.

FIG. 6 is a perspective view showing the optical configuration of a main part of the above-described focus detecting device. The focus detecting device shown in FIG. 6 includes a pair of image-re-forming optical systems.

In FIG. 6, the visual-field mask 1010, the field lens 1020, the multiple-aperture plate 1060, the image-re-forming lens unit 1070, and the sensor unit 1090 shown in FIGS. 3 and 5 are simplified.

The sensor unit 1090 according to the first embodiment includes at least one pair of line sensors 1091 whose detection area is larger than the detection area for obtaining the focusing state of an object. An image of an object formed at a position close to the visual-field mask 1010 is re-formed by the image-re-forming lens unit 1070, and the re-formed images are detected by the line sensors 1091. In addition, the line sensors 1091 also detect the images of an edge of the visual-field-mask opening 1014 formed in the visual-field mask 1010, the visual-field-mask opening 1014 serving as a reference member.

Reference numeral 1015 denotes an image of the line sensors 1091 projected reversely onto the visual-field mask 1010. The line sensors 1091 detect the images of the edge of the visual-field-mask opening 1014, which serves as the reference member. The images of the edge of the visual-field-mask opening 1014 are formed as a combination of bright regions at which light emitted from the imaging optical system passes through the visual-field-mask opening 1014 and dark regions at which light is blocked.

According to the first embodiment, the amount of correction for the defocus information (amount of displacement), that is, the change in the stat of the reference member caused by variations in ambient temperature, ambient humidity, etc., is determined on the basis of a difference between the actually obtained image and a preset image of the edge of the visual-field-mask opening 1014, which serves as the reference member.

Figure 7:
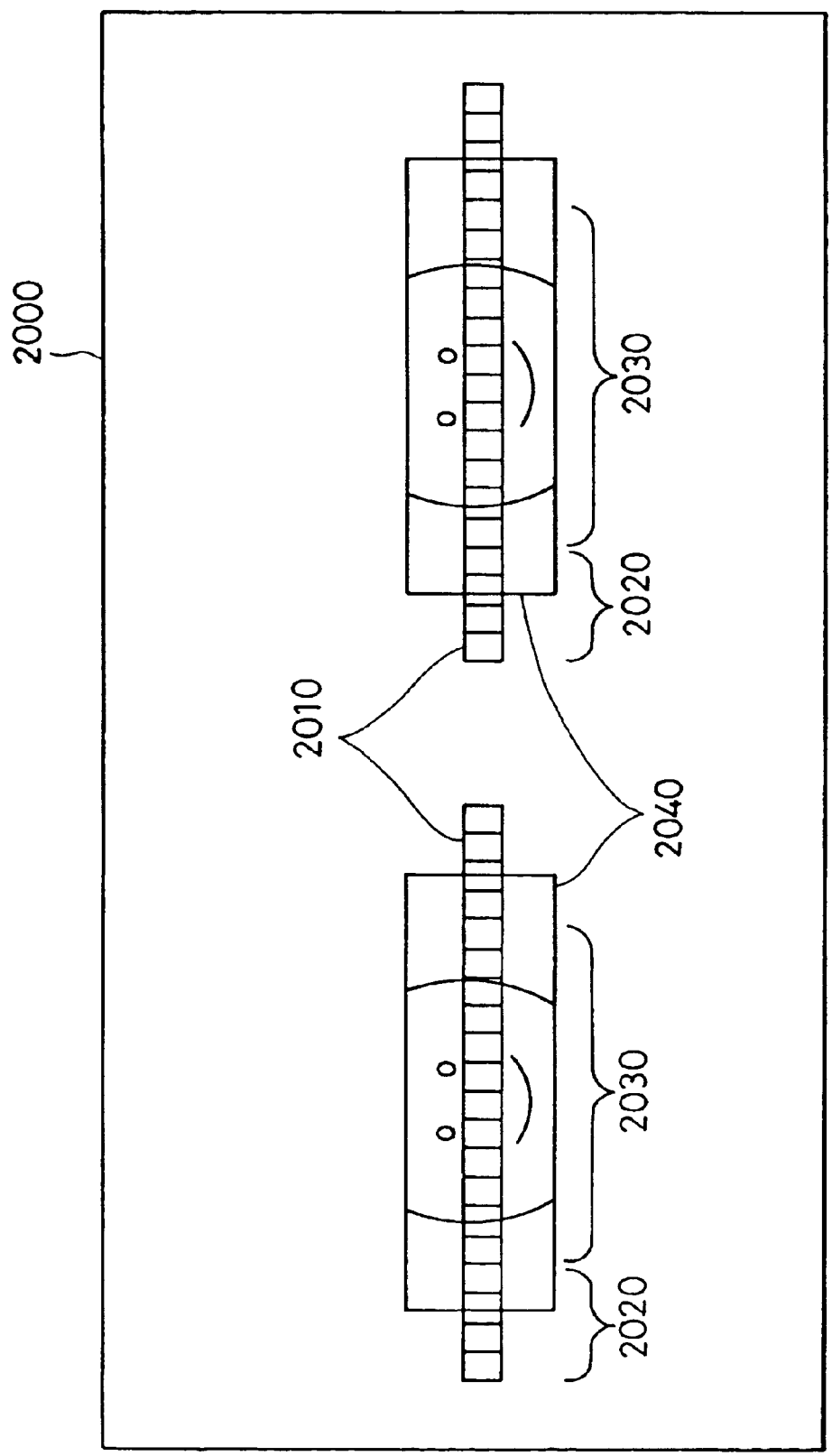
FIG. 7 is a diagram showing images formed on a sensor unit according to the first embodiment of the present invention.

FIG. 7 is a diagram showing an example of a sensor unit which serves as a detection unit in the above-described focus detecting device. With reference to FIG. 7, a sensor unit 2000 includes a pair of line sensors 2010.

In the line sensors 2010, reference numeral 2030 denotes focus detection areas used for detecting the state of the image of the object formed by the imaging optical system. In addition, reference numeral 2020 denotes reference detection areas used for detecting the change in the state of the focus detecting apparatus and determining the amount of correction for the detection result obtained at the focus detection areas 2030. More specifically, the reference detection areas 2020 are used for detecting the edge of the visual-field-mask opening 1014. Reference numeral 2040 denotes visual-field-mask images (images of the visual-field-mask opening 1014) which restrict the detection area of the focus detecting device. The visual-field-mask images 2040 show the projection areas in which the images of the object are projected by the visual-field mask 1010, and the images of the object are not formed outside the visual-field-mask images 2040.

As shown in FIG. 7, in the focus detecting device according to the first embodiment, the line sensors 2010 are extended beyond the detection visual fields determined by the visual-field mask 1010, and the reference detection areas 2020 detect the visual-field-mask images 2040, which define the focus detection area of the focus detecting device (more specifically, the images of the edge of the visual-field-mask opening 1014 are detected). Since the visual-field mask 1010 is fixed relative to the focus detecting device as described above, the visual-field-mask images 2040 can be reliably used as a reference member.

Although the sensor unit 2000 having only one pair of line sensors 2010 is explained above with reference to FIG. 7, the focus detecting device may of course include a sensor unit having two or more pairs of line sensors. In addition, although both the image of the object and the image of the edge of the visual-field-mask opening are detected by the same line sensor, a line sensor for detecting the image of the object and a line sensor for detecting the image of the edge of the visual-field-mask opening may also be formed separately.

Figure 8:
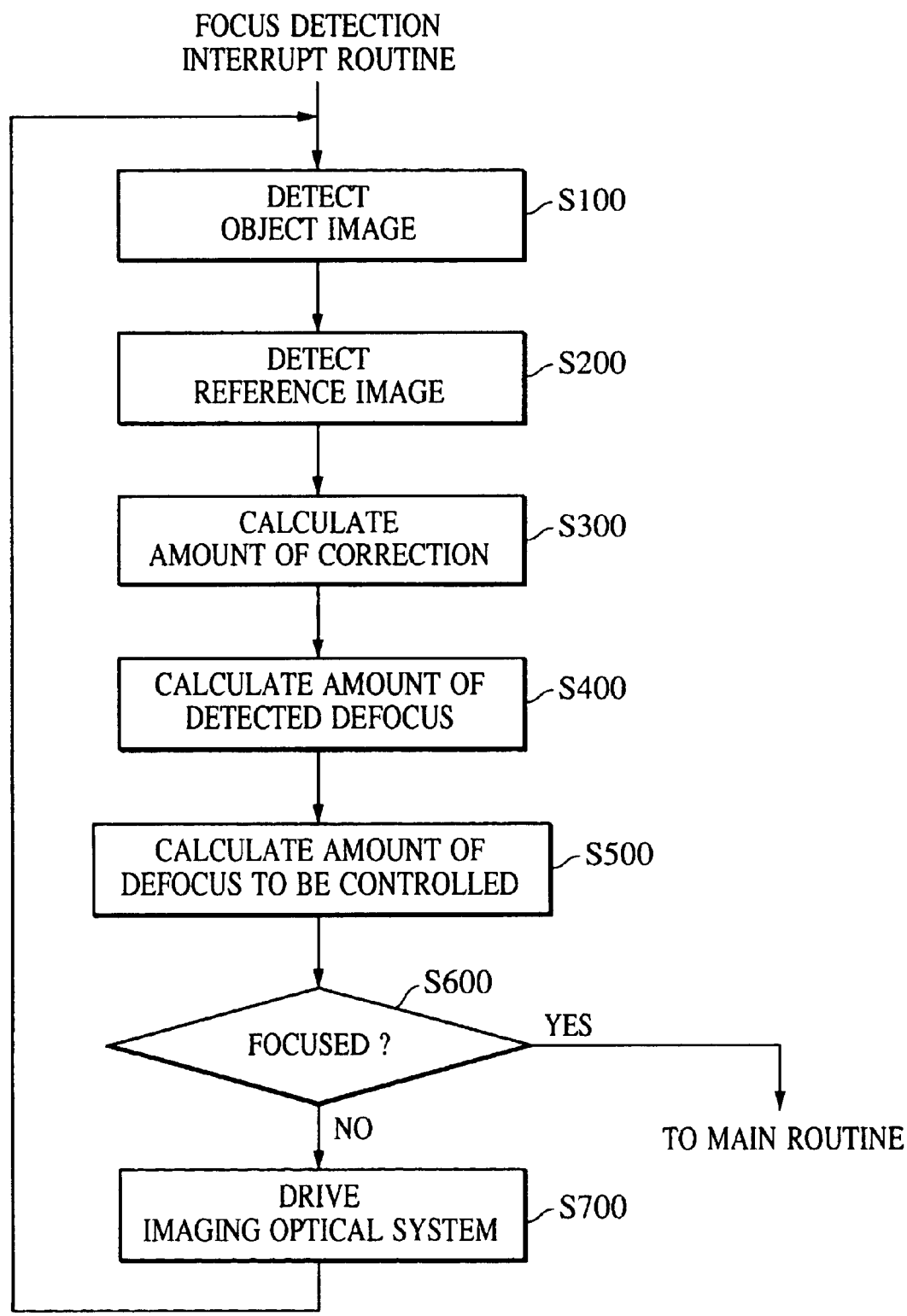
FIG. 8 is a flowchart showing a focus-detecting operation performed in the imaging device according to the first embodiment of the present invention.

FIG. 8 is a flowchart showing a focus detection operation performed in the imaging device according to the first embodiment.

At S100, an image of an object is detected by the detection unit (sensor unit 2000). Next, at S200, an image of the edge of the visual-field-mask opening 1014, which serves as the reference member, is detected (hereinafter referred to as a reference image). Next, at S300, an amount of correction is calculated on the basis of the reference image detected at S200 by the following method.

First, the reference images detected at the reference detection areas 2020 shown in FIG. 7 are compared and the distance therebetween is determined. This distance is determined by detecting an image position at which the detected reference images overlap each other. After the distance between the detected reference images is obtained, the difference between the obtained distance and a preset reference distance is calculated, and this difference is determined as the amount of correction.

Then, at S400, an amount of detected defocus is calculated by using the object image detected at S100. Then, at S500, an amount of defocus to be controlled, that is, an amount of defocus actually used for driving the imaging optical system, is calculated on the basis of the amount of correction calculated at S300 and the amount of detected defocus calculated at S400. Then, at S600, it is determined whether or not the imaging optical system is focused, and the process returns to the main routine when the result at S600 is YES. When the result at S600 is NO, the imaging optical system is driven at S700, and then the process returns to S100.

Second Embodiment

Figure 9:
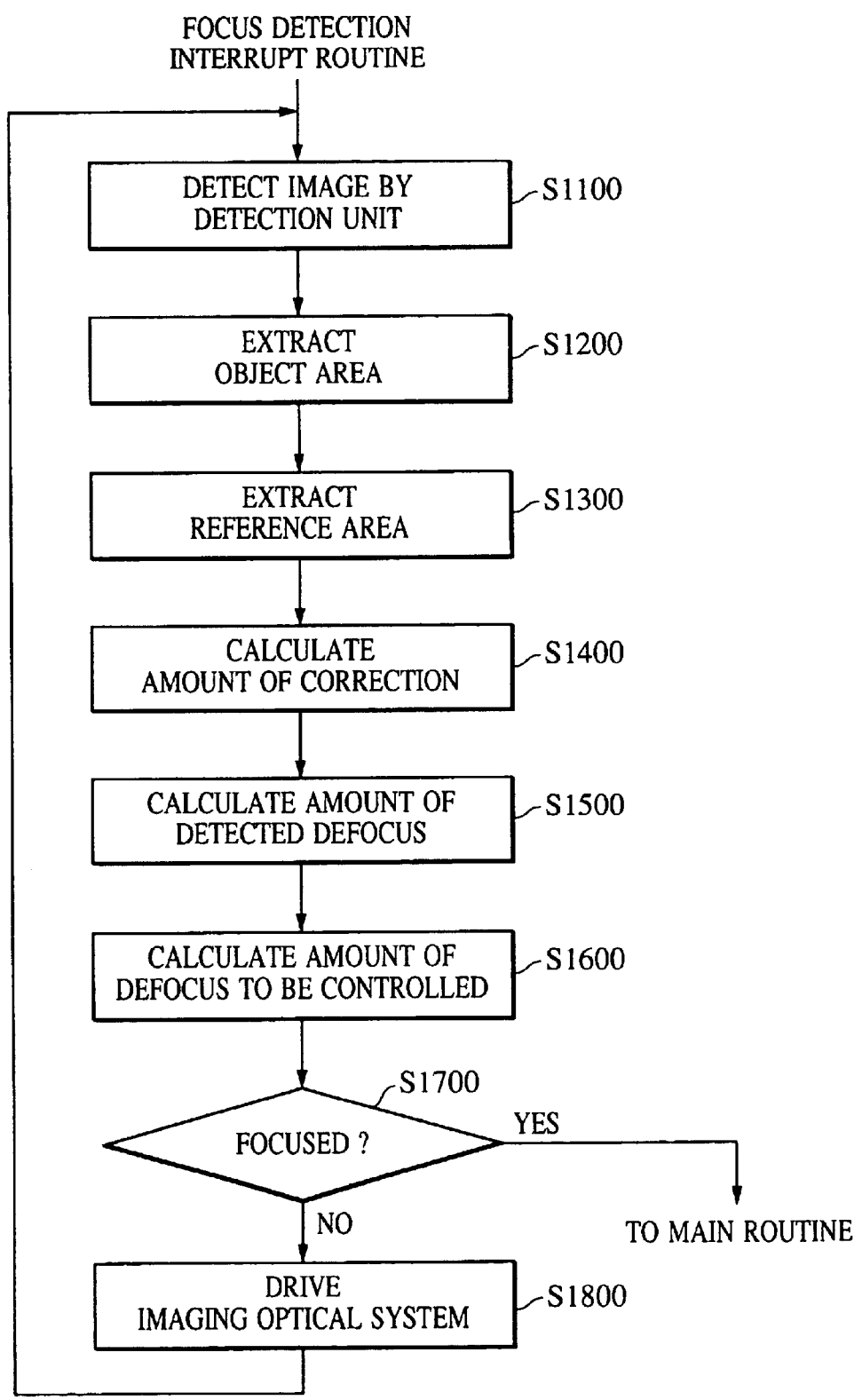
FIG. 9 is a flowchart showing a focus-detecting operation performed in an imaging device according to a second embodiment of the present invention.

FIG. 9 is a flowchart showing a focus detection operation performed in an imaging device according to a second embodiment of the present invention. The construction of the imaging device is the same as that of the imaging device according to the first embodiment.

With reference to FIG. 9, at S1100, an image is detected by the detection unit. Next, at S1200, an object area used for focusing-state detection for the imaging optical system is extracted from the detected image obtained at S1100. Next, at S1300, a reference area is extracted from the detected image obtained at S1100. Next, at S1400, an amount of correction for the focus detecting device is calculated on the basis of the reference image extracted at S1300. More specifically, the reference images at the reference detection areas 2020 shown in FIG. 7, the reference images being extracted at S1300 from the detected images detected by the line sensors 2010 at S1100, are compared and the distance therebetween is determined. The distance between the reference images are determined by comparing the reference images extracted at S1300 from the detected images obtained at S1100. At S100 to S300 in FIG. 8 according to the first embodiment, the object image and the reference image are detected separately. In contrast, at the above-described S1100 to S1300, the object image and the reference image are obtained simultaneously, and then the object image and the reference image are extracted from the obtained image.

The above-described distance between the detected images is determined by detecting an image position at which the detected images overlap each other. After the distance between the detected images is obtained, the difference between the obtained distance and a preset reference distance is calculated, and this difference is determined as the amount of correction.

Then, at S1500, an amount of detected defocus is calculated by using the object image extracted at S1200. Then, at S1600, an amount of defocus to be controlled, that is, the amount of defocus actually used for driving the imaging optical system, is calculated on the basis of the amount of correction calculated at S1400 and the amount of detected defocus calculated at S1500. Then, at S1700, it is determined whether or not the imaging optical system is focused, and the process returns to the main routine when the result at S1700 is YES. When the result at S1700 is NO, the imaging optical system is driven at S1800, and then the process returns to S1100.

Third Embodiment

Figure 10:
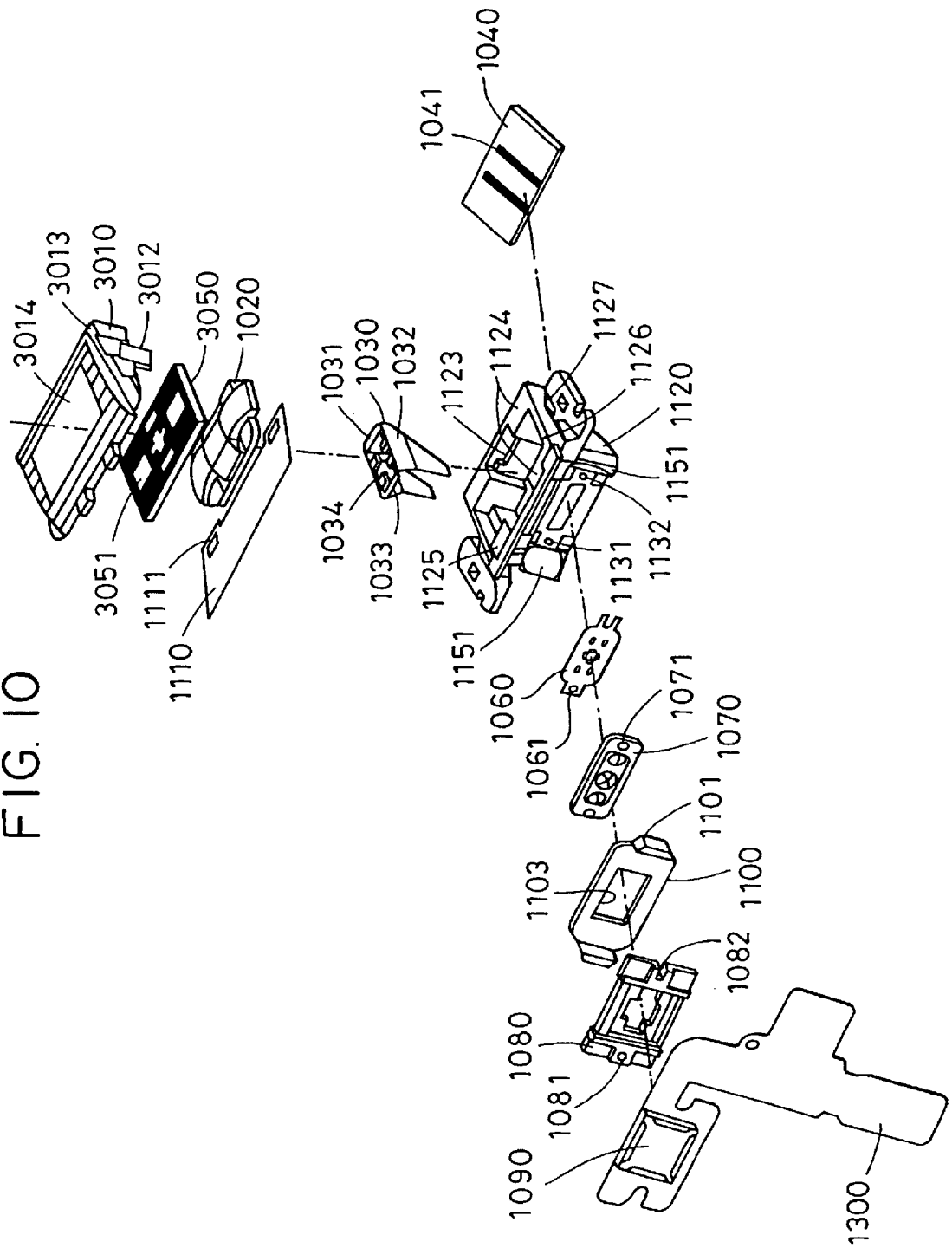
FIG. 10 is an exploded perspective view showing a focus detecting device according to a third embodiment of the present invention.

FIG. 10 is a perspective view showing an focus detecting device according to a third embodiment of the present invention. The focus detecting device according to the third embodiment includes a reference member having a construction different from that in the first embodiment. Components similar to those shown in FIG. 3 are denoted by the same reference numerals, and explanations thereof are omitted.

In FIG. 10, a visual-field mask 3010 is positioned relative to the main block 1120 by fitting a pair of visual-field-mask positioning shafts (not shown in FIG. 10) provided on the visual-field mask 3010 into a pair of visual-field-mask positioning holes 1125 and 1126 formed in the main block 1120. The visual-field-mask positioning hole 1125 restricts the movement of the visual-field mask 3010 along the surface at which the visual-field mask 3010 is attached and the visual-field-mask positioning hole 1126, which has an oblong shape, restricts the rotation of the visual-field mask 3010 relative to the visual-field-mask positioning hole 1125. In addition, the visual-field mask 3010 is fixed relative to the main block 1120 by engaging a pair of visual-field-mask fixing elastic claw portions 1012 provided on the visual-field mask 3010 with a pair of visual-field-mask fixing holes 1127 formed in the main block 1120. In addition, the visual-field mask 3010 is also provided with a visual-field-mask restraining portion 1013 which serves to prevent the visual-field mask 3010 from being raised even when the visual-field-mask fixing elastic claw portions 1012 are disengaged from the visual-field-mask fixing holes 1127 after the focus detecting device is mounted in the camera.

The visual-field-mask restraining portion 3013 also serves to reduce a gap between a mirror box of the camera and the focus detecting device.

Reference numeral 3014 denotes a visual-field-mask openings formed in the visual-field mask 3010.

In the third embodiment, an infrared-cut filter 3050 (which correspond to the infrared-cut filter 1050 in FIG. 1)

for blocking the infrared light beam component in the detection light beam is disposed between the visual-field mask 3010 and the field lens 1020. Accordingly, the infrared-cut filter 3050 is disposed at a position close to the predetermined image plane of the imaging optical system. A reference pattern 3051 formed on the infrared-cut filter 3050 serves as a reference member, and the amount of correction for the detection result of the focus detecting device is obtained by detecting the reference member (reference pattern 3051) by using the sensor unit 1090. The reference pattern 3051 is formed in a shape corresponding to the detection visual field, so that the visual-field mask 3010 and the reference pattern 3050 serve similarly to the visual-field mask 1010 shown in FIG. 3.

Fourth Embodiment

Figure 11:
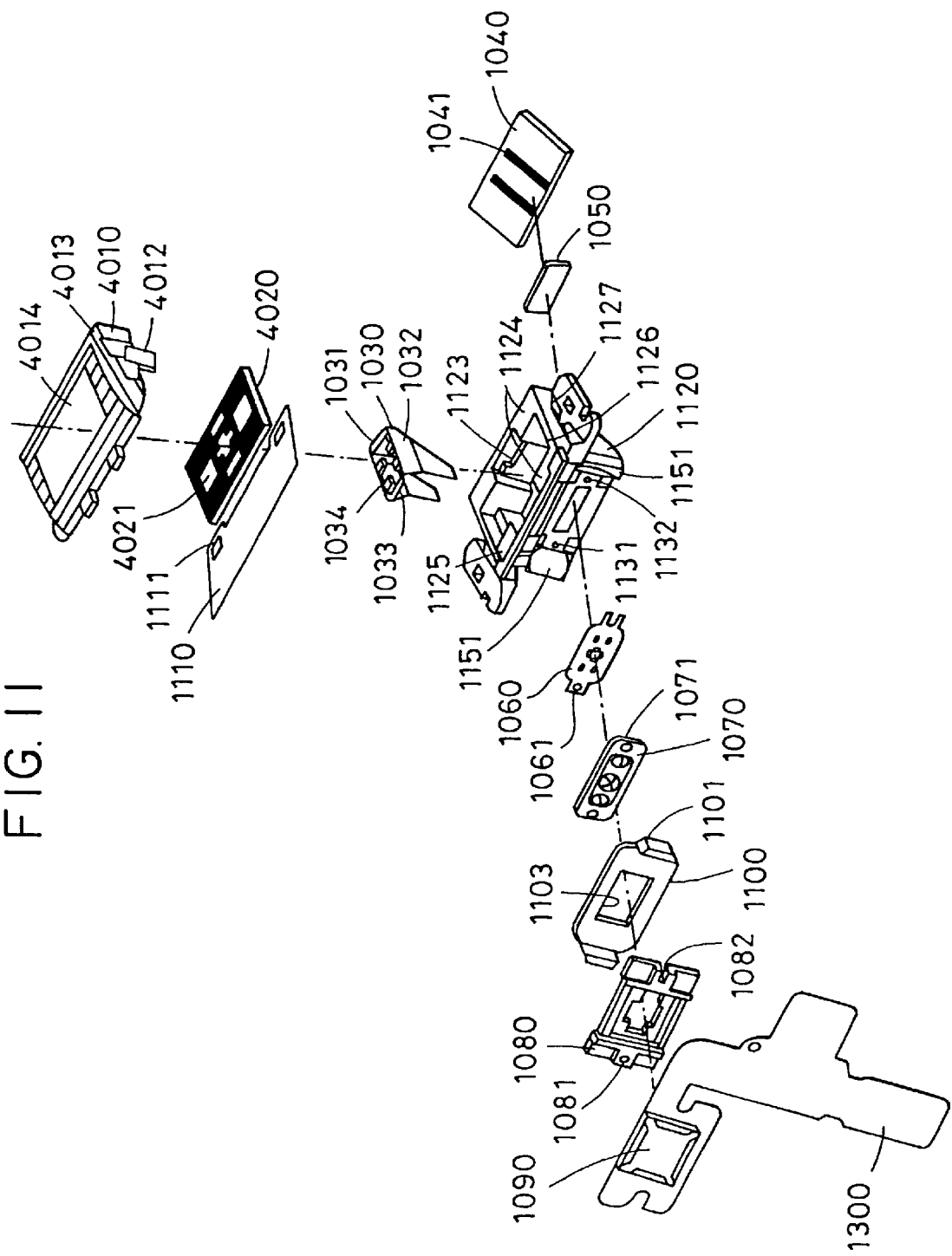
FIG. 11 is an exploded perspective view showing a focus detecting device according to a fourth embodiment of the present invention.

FIG. 11 is a perspective view showing an focus detecting device according to a fourth embodiment of the present invention. The focus detecting device according to the fourth embodiment includes a reference member having a construction different from those in the first and second embodiments. Components similar to those shown in FIG. 3 are denoted by the same reference numerals, and explanations thereof are omitted.

In FIG. 11, a visual-field mask 4010 is positioned relative to the main block 1120 by fitting a pair of visual-field-mask positioning shafts (not shown in FIG. 11) provided on the visual-field mask 4010 into a pair of visual-field-mask positioning holes 1125 and 1126 formed in the main block 1120. The visual-field-mask positioning hole 1125 restricts the movement of the visual-field mask 4010 along the surface at which the visual-field mask 4010 is attached and the visual-field-mask positioning hole 1126, which has an oblong shape, restricts the rotation of the visual-field mask 4010 relative to the visual-field-mask positioning hole 1125. In addition, the visual-field mask 4010 is fixed relative to the main block 1120 by engaging a pair of visual-field-mask fixing elastic claw portions 4012 provided on the visual-field mask 4010 with a pair of visual-field-mask fixing holes 1127 formed in the main block 1120. In addition, the visual-field mask 4010 is also provided with a visual-field-mask restraining portion 4013 which serves to prevent the visual-field mask 4010 from being raised even when the visual-field-mask fixing elastic claw portions 4012 are disengaged from the visual-field-mask fixing holes 1127 after the unit of the focus detecting device is installed in the camera.

The visual-field-mask restraining portion 4013 also serves to reduce a gap between a mirror box of the camera and the focus detecting device.

Reference numeral 4014 denotes a visual-field-mask openings formed in the visual-field mask 4010.

In the fourth embodiment, a reference pattern 4021, which serves as the reference member for detecting the state of the focus detecting device, is formed on a field lens 4020, which is a condenser lens placed between the imaging optical system and the image-re-forming system.

In the fourth embodiment, the field lens 4020 has an approximately flat surface (first surface) onto which the light beam emitted from the imaging optical system is incident, and the reference pattern 4021 is formed on the first surface of the field lens 4020. The reference pattern 4021 of the fourth embodiment is formed by printing a light-blocking material on the field lens 4020. In addition, the reference pattern 4021 is formed such that the field lens 4020 can also serve as a visual-field mask for restricting the detection visual field.

Fifth Embodiment

Figure 12:
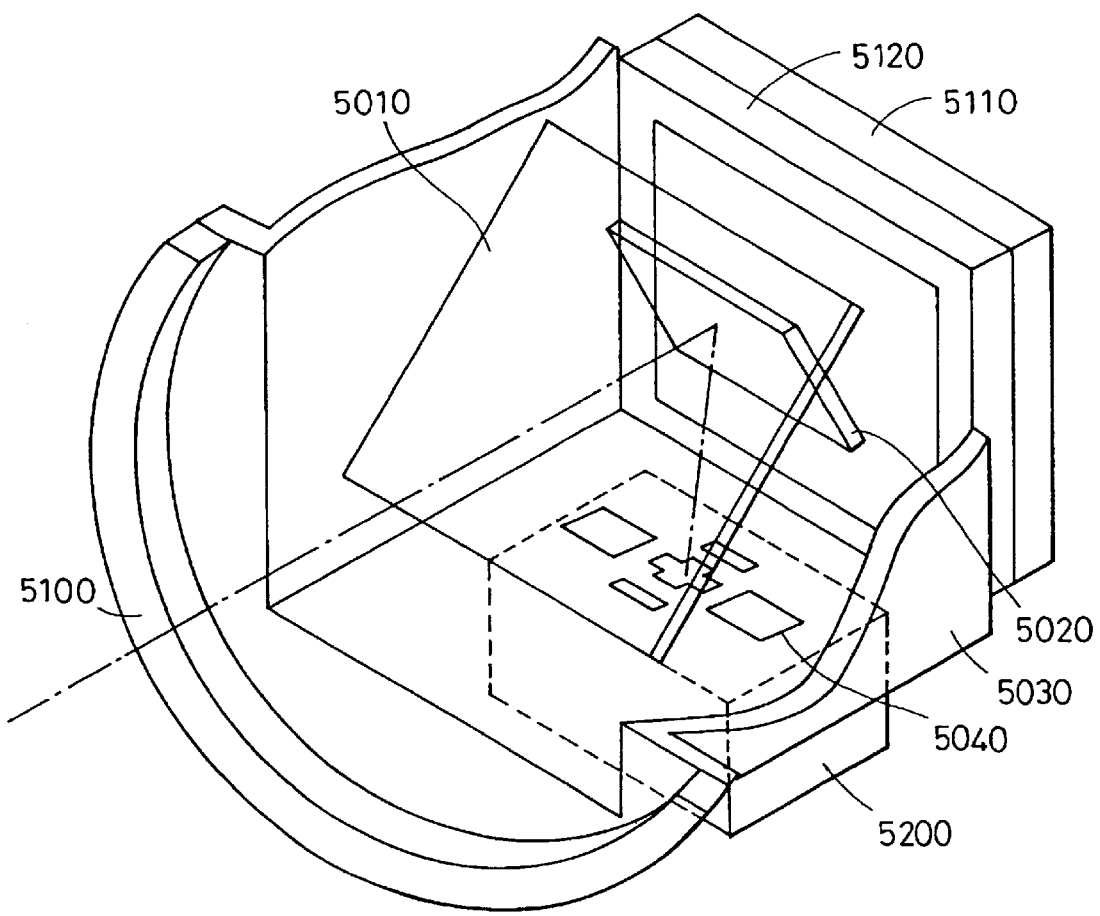
FIG. 12 is a perspective view showing a mirror box installed in a focus detecting device according to a fifth embodiment of the present invention.

FIG. 12 is a perspective view showing an interior of a mirror box of an imaging device according to a fifth embodiment of the present invention, where a reference member is formed on a surface on which a focus detecting device is attached.

In FIG. 12, reference numeral 5010 denotes a main mirror member which divides a light beam emitted from the imaging optical system (not shown) into a light beam component guided toward a finder optical system which serves an observing optical system (not shown) and a light beam component guided toward a detection unit. In addition, reference numeral 5020 denotes a submirror which deflects the light beam component separated by the main mirror member 5010 toward the focus detecting device. In FIG. 12, the submirror 5020 guides the light beam component toward the lower side from the mirror box.

Reference numeral 5030 denotes the mirror box, and the mirror box 5030 is provided with a reference member 5040 at a surface on which the focus detecting device is attached. The reference member 5040 forms at least a part of a visual-field mask which restricts the detection visual field of the focus detecting device, so that the reference member 5040 serves also as the visual-field mask.

Reference numeral 5100 denotes a mounting member which retains the imaging optical system (not shown), reference numeral 5110 denotes an imaging element, and reference numeral 5120 denotes a shutter member which shields the imaging optical system 5110 from light and opens when a detecting operation is performed. Reference numeral 5200 denotes a focus detecting device which detects the state of the imaging optical system.

In the fifth embodiment, the reference member 5040 is formed on the surface of the mirror box 5030 on which the focus detecting device is attached. Since the reference member 5040 serves also as the visual-field mask, it is not necessary to install an additional visual-field mask in the focus detecting device 5200.

According to the above-described embodiments of the present invention, the reference member may be formed of a light-blocking member such as a visual-field mask included in the focus detecting device. In addition, when the reference member is formed on an optical component, it may also be used as a light-blocking member. The amount of change in the detection result of the focus detecting device caused by temperature variation, humidity variation, etc., is determined by using an image (projection image) of the light-blocking member formed by the detection optical system, and the amount of correction (amount of displacement) is calculated on the basis of the determined amount of change. Accordingly, the amount of correction can be determined at the same accuracy as the detection accuracy of the defocus information without forming an additional pattern as a reference member.

Accordingly, errors due to the difference between the actual state and the state of the focus detecting device (image-re-forming optical system, etc.) do not occur in the focus-detecting operation, and the change in defocus information, that is, the change in the detection result obtained by the focus detecting device, caused by various factors such as temperature variation and humidity variation can be reliably corrected.

More specifically, according to the above-described embodiments of the present invention, the following effects can be obtained.

The image (projection image) of the edge of the reference member (the visual-field mask opening 1014 in FIG. 3, the reference pattern 3051 in FIG. 10, and the reference pattern 4021 in FIG. 11), which is disposed at a position close to the predetermined image plane, is detected by the sensor unit which serves at the detection unit, and the amount of correction for the result of focus detection is calculated on the basis of the detection result. Then, the defocus information is corrected by using the determined amount of correction. Thus, errors caused by the difference between a temperature detected by a sensor and the actual temperature, errors caused by the humidity variation, etc., which have been impossible to eliminate in the known art, can be eliminated, and the change in the result of focus detection can be accurately corrected.

The reference member is disposed at a position closer to the detection unit than the predetermined image plane of the imaging optical system as shown in FIG. 1, so that the image of the reference member is formed at a position closer than the image of the object. Accordingly, the reference image and the object image can be made different (this makes the calculation of the amount of correction easier) and the reference member can be disposed at a position apart from the imaging light path. In other words, when the reference member is projected onto the object, the image of the reference member is formed at a position closer to the imaging device than the object, so that the image of the reference member is separated from the image of the background. Thus, the object image and the reference image can be separated from each other, and false detection of reference image can be prevented.

The reference member serves also as a component of the focus detecting device and is fixed to the focus detecting device. Accordingly, it can be reliably used as a reference member, and displacements thereof can be prevented.

Since the reference member is formed of a member having a light-blocking function such as a visual-field mask, the reference member can also be used to block unwanted light beams.

Since the reference member is formed of a visual-field aperture which restricts the detection area of the image-re-forming optical system, the amount of correction can be determined without an additional reference member.

When the reference member is formed on a mirror box, an additional reference member is of course not required, and the reference member can be disposed at a position still closer to the predetermined image plane. Accordingly, the projection image of the reference member can be detected without blurring.

When the reference member is formed on a surface to which the focus detecting device is attached, an additional reference member is of course not required, and the reference member can be disposed at a position still closer to the predetermined image plane. Accordingly, the projection image of the reference member can be detected without blurring.

The reference member is disposed at a position closer to the imaging optical system than the optical components of the focus detecting device. More specifically, the visual-field mask 1010 is disposed at a position closer to the imaging optical system than the field lens 1020 in FIG. 3, the reference pattern 3051 is disposed at a position closer to the imaging optical system than the infrared-cut filter 3050 in FIG. 10, and the reference pattern 4021 is disposed at a position closer to the imaging optical system than the field lens 4020 in FIG. 11. Accordingly, the detection unit is able to detect all the displacements of the above-described optical components.

The above-described detection unit is used for detecting both the focusing state of the imaging optical system and the state of the reference member. In other words, both the focusing state of the imaging optical system and the state of the reference member are detected by a single sensor unit. Accordingly, defocus information and the amount of correction for the defocus information can both be obtained at the same time.

The reference member is formed on one of the optical components which is closest to the predetermined image plane. Accordingly, the projection image of the reference member can be detected without blurring.

Modifications

Although the focus detecting devices for the camera using a film are explained in the above-described embodiments, the present invention may also be applied to a ranging device.

In addition, the present invention may of course be applied to an imaging device which records on other types of recording medium such as magnetic or electrical recording medium. For example, the present invention may also be applied to a digital camera.

In addition, although both the defocus information and the projection image of the reference member is detected by a single sensor unit in the above-described embodiments, the present invention is not limited to this, and the defocus information and the projection image of the reference member may also be detected by different sensor units.

Furthermore, although the amount of correction for the defocus information (amount of displacement) is determined by detecting the image (projection image) of the edge of the reference member, the present invention is not limited to this as long as a projection image with which the displacement caused by the temperature variation, etc., can be determined is formed on a component of the focus detecting device.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A device for determining an amount of focus adjustment for an image-forming optical system which forms an image on a predetermined image plane, the device for determining an amount of focus adjustment comprising:

a sensor;

an image-re-forming optical system which re-forms the image on the sensor;

a mask member which has an opening disposed at a position close to the predetermined image plane of the image-forming optical system, wherein the opening of said mask member is projected on said sensor by said image-re-forming optical system and said sensor receives an image of an edge of the projected opening; and a correcting circuit which corrects an amount of focus adjustment on the basis of the projected opening edge image detected by said sensor.

2. A device according to claim 1, wherein the width of the projected opening is shorter than said sensor.

3. A device according to claim 1, wherein said sensor comprises a pair of sensor members, wherein the image of the predetermined image plane and the opening image are projected on said pair of sensor members, and wherein the amount of focus adjustment is calculated on the basis of the projected image of the predetermined image plane.

4. A device for determining an amount of focus adjustment for an image-forming optical system which forms an image on a predetermined image plane, the device for determining an amount of focus adjustment comprising:

a first sensor;

an image-re-forming optical system which re-forms the image on said first sensor;

a second sensor;

a mask member which has an opening disposed at a position close to the predetermined image plane of the image-forming optical system, wherein the opening of said mask member is projected on said second sensor by said image-re-forming optical system and said second sensor receives an image of an edge of the projected opening; and a correcting circuit which corrects an amount of focus adjustment detected by said first sensor on the basis of the projected opening edge image detected by said second sensor.

5. A device according to claim 4, wherein said first sensor and said second sensor are on one line.

* * * * *

UNITED STATES PATENT AND TRADEMARK OFFICE
CERTIFICATE OF CORRECTION

PATENT NO.    : 6,707,994 B2
DATED         : March 16, 2004
INVENTOR(S)   : Kazuyuki Nakagawa It is certified that error appears in the above-identified patent and that said Letters Patent is hereby corrected as shown below:

Column 6,
Line 36, "stat" should read -- state --.

Column 8,
Line 31, "an" should read -- a --.

Column 9,
Line 16, "an" should read -- a --.

Signed and Sealed this

Fifteenth Day of March, 2005

JON W. DUDAS
*Director of the United States Patent and Trademark Office*